United States Patent [19]
Weimer et al.

[11] Patent Number: 5,743,992
[45] Date of Patent: Apr. 28, 1998

[54] BUTT FUSION APPARATUS WITH CONSTANT PRESSURE ACCUMULATOR

[75] Inventors: James Callen Weimer, Charleston; Jack Lee Workman, Alum Creek; Gary Wayne Gunno, Charleston, all of W. Va.

[73] Assignee: Hughes Supply, Inc., Orlando, Fla.

[21] Appl. No.: 639,125

[22] Filed: Apr. 26, 1996

Related U.S. Application Data

[63] Continuation-in-part of Ser. No. 593,161, Feb. 1, 1996, which is a continuation-in-part of Ser. No. 551,119, Oct. 31, 1995.

[51] Int. Cl.$^6$ .............................. B29C 65/20; B65H 69/06
[52] U.S. Cl. ................... 156/358; 156/158; 156/304.2; 156/304.6; 156/503; 60/413
[58] Field of Search ................ 156/158, 304.2, 156/304.6, 358, 499, 503; 60/413, 404, 405

[56] References Cited

U.S. PATENT DOCUMENTS

| | | | |
|---|---|---|---|
| 3,013,925 | 12/1961 | Larsen | 156/503 X |
| 3,729,360 | 4/1973 | McElroy | 156/499 |
| 4,263,084 | 4/1981 | Takala | 156/158 X |
| 4,352,708 | 10/1982 | McElroy | 156/503 X |
| 4,640,732 | 2/1987 | Stafford | 156/503 X |
| 4,957,570 | 9/1990 | Jenkins et al. | 156/158 X |
| 5,013,376 | 5/1991 | McElroy, II et al. | 156/358 X |
| 5,527,406 | 6/1996 | Brath | 156/358 X |

FOREIGN PATENT DOCUMENTS

1479185  12/1970  Germany.

*Primary Examiner*—Jeff H. Aftergut
*Attorney, Agent, or Firm*—Adams Law Firm, P.A.

[57] ABSTRACT

An apparatus for attaching abutting ends of first and second coaxial pipe sections together. The apparatus includes a support frame, a fixed pipe clamping jaw having upper and lower jaw halves carried by the support frame for positioning the first pipe section in a fixed position, a movable pipe clamping jaw having upper and lower jaw halves carried by the support frame for translating movement of the second pipe section relative to the fixed clamping jaw and into aligned abutment with the first pipe section, heating means for heating adjacent pipe ends to a butt fusion temperature and a hydraulic circuit including a hydraulic pressure pump for supplying pressure to hydraulic movement means to translate the movable pipe clamping jaws towards fixed pipe clamping jaws to the join the first and second heated pipe sections together under pressure. The apparatus also includes supplemental hydraulic pressure means for supplying hydraulic pressure to the hydraulic joining means upon loss of pressure from the hydraulic pressure pump.

3 Claims, 8 Drawing Sheets

BUTT FUSION APPARATUS WITH CONSTANT PRESSURE ACCUMULATOR

TECHNICAL FIELD AND BACKGROUND OF THE INVENTION

This application is a continuation-in-part of application Ser. No. 08/593,161, filed on Feb. 1, 1996, pending, which is a continuation-in-part of application Ser. No. 08/551,119 filed on Oct. 31, 1995, pending.

This invention relates to a butt fusion apparatus for joining fabricated or molded thermally-joinable pipe fittings to a thermally joinable pipe. The invention disclosed in this application relates to a means for maintaining constant pressure on the fusion joint while the joint material is cooling with the machine off.

The rapidly expanding use of plastic pipe to form pipelines in the industrial, commercial and municipal industries has given rise to a need to refine and improve prior art thermal joining procedures. These improved procedures reduce the amount of pipe misalignment and other joining parameters to provide acceptable thermally fused joint on adjacent prepared pipe ends.

The crucial part of the butt fusion process is properly mating the pipe ends to be joined and maintaining the proper mating position while the fused molten plastic at the joint cools to form the solid joint. The proper position is maintained by holding the proper hydraulic pressure on the joint during the cooling cycle. Variation in this pressure can cause separation or a weakened joint. During normal machine operation constant pressure can be easily maintained in the hydraulic circuit since the pumping unit is running. However, if power to the machine is lost, or if the operator has finished work for the day and wishes to cut off the machine before the joint completely cooled, pressure would drop and possibly create an improper joint. This invention provides a means of maintaining proper pressure on the guide rod cylinders even when the machine is off.

SUMMARY OF THE INVENTION

Therefore, it is an object of the invention to provide a butt fusion machine which maintains proper pressure on a cooling fusion joint upon inadvertent power loss to the butt fusion machine.

It is another object of the invention to provide a butt fusion machine which permits the operator to cut the butt fusion machine off and leave a fusion joint to cool under proper pressure.

These and other objects of the present invention are achieved in the preferred embodiments disclosed below by providing an apparatus for attaching abutting ends of first and second coaxial pipe sections together. The apparatus includes a support frame, a fixed pipe clamping jaw having upper and lower jaw halves carried by the support frame for positioning the first pipe section in a fixed position, a movable pipe clamping jaw having upper and lower jaw halves carried by the support frame for translating movement of the second pipe section relative to the fixed clamping jaw and into aligned abutment with the first pipe section, heating means for heating adjacent pipe ends to a butt fusion temperature and a hydraulic circuit including a hydraulic pressure pump for supplying pressure to hydraulic movement means to translate the movable pipe clamping jaw towards fixed pipe clamping jaw to the join the first and second heated pipe sections together under pressure. The apparatus also includes supplemental hydraulic pressure means for supplying hydraulic pressure to the hydraulic joining means upon loss of pressure from the hydraulic pressure pump.

According to one preferred embodiment of the invention, the supplemental hydraulic pressure means comprises a hydraulic pressure accumulator.

According to another preferred embodiment of the invention, the hydraulic pressure accumulator comprises an accumulator vessel communicating with the hydraulic circuit for accumulating hydraulic fluid under pressure, and valve means for preventing loss of hydraulic pressure upon loss of pressure in the hydraulic circuit.

According to another preferred embodiment of the invention, the valve means comprises a blocking valve positioned in the hydraulic circuit between the accumulator vessel and the hydraulic pump.

According to yet another preferred embodiment of the invention, the supplemental hydraulic pressure means includes pressure regulator control means for accumulating a pressure in the accumulator vessel appropriate to the pipe joints being fused.

According to yet another preferred embodiment of the invention, the hydraulic movement means comprises a pair of guide rods on which the moveable jaws are mounted for translating movement, and a pair of hydraulic guide rod cylinders in which respective ones of the guide rods are mounted for hydraulic pressure-induced movement.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

General Description

Figure 1:
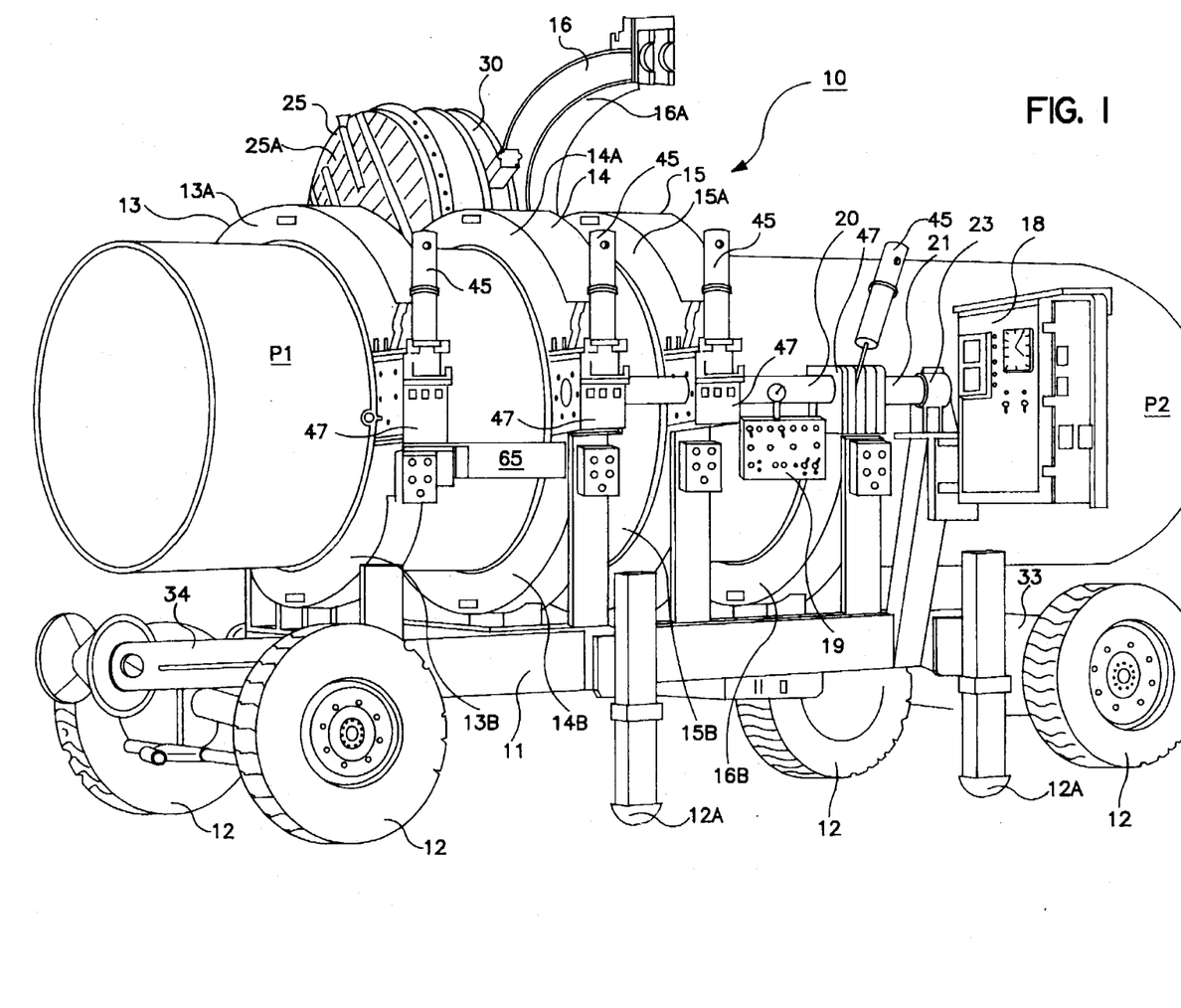
FIG. 1 is a perspective view of the butt fusion machine according to a preferred embodiment of the invention.

Referring now specifically to the drawings, a butt fusion machine according to the present invention is illustrated in FIG. 1 and shown generally at reference numeral 10. The butt fusion machine 10 may be fixed or mobile. The butt fusion machine 10 shown in FIG. 1 is a mobile unit, and includes a support frame 11, mounted on four wheels 12 which allow the butt fusion machine 10 to be towed from job site to job site and to be self-propelled on the job site as the pipeline is assembled.

Hydraulic jacks 12A located on both sides of the frame 11 permit the butt fusion machine 10 to be precisely positioned and stabilized to receive and support the pipe to be fused in the proper alignment.

Four pipe clamping jaws 13, 14, 15 and 16 are mounted and carried in spaced-apart relation on the support frame 11. Jaws 13 and 14 are fixed in relation to jaws 15 and 16, which are movable and translate along a longitudinal translation axis of the butt fusion machine 10 by the action of guide rods 21 and guide rod cylinders 20.

Each of the jaws 13–16 are formed of upper and lower halves 13A,13B, 14A,14B, 15A,15B and 16A,16B hinged to each other, as described in further detail below, so that they may be opened for placing pipe sections in, and removing pipe sections from, the jaws 13–16.

The moving jaws 15 and 16 translate along the longitudinal axis of the butt fusion machine 10 by the combined action of the guide rods 21 and guide rod cylinders 20, which are positioned on opposite, lateral sides of the jaws 15 and 16 and extend forward to jaw 14, so that the pivot axis of all of the jaws 13–16 are coincident. Rods 21 are vertically supported at one end by fixed jaw 14 and on the other end by a rear cylinder support assembly 23.

A heating assembly 25 is provided on the machine for heating the ends of pipe sections "P1" and "P2" prior to joining. A facing tool 30 squares the pipe ends before joining. Both the heating assembly 25 and facing tool 30 are pivotally-mounted on one side of the support frame 11 and are moved about a radially-offset pivot axis into and out of a position between the ends of the pipe sections "P1" and "P2" to be fused. The facing tool 30 is a disc-shaped cutter having a pair of radially-extending cutter blades on opposite sides of the tool. Rotation of the cutter blades allows abutting ends of the pipe sections "P1" and "P2" to be trimmed into parallel alignment in order to achieve an exact, even fusion. After facing the pipe sections "P1" and "P2", the facing tool 30 is retracted and the heating assembly 25 is rotated into position. Opposing non-stick radial surfaces 25A and 25B of the heating assembly evenly heat the opposed, abutting ends of the pipe sections "P1" and "P2" to fusion temperature. These processes are described in further detail below.

Figure 2:
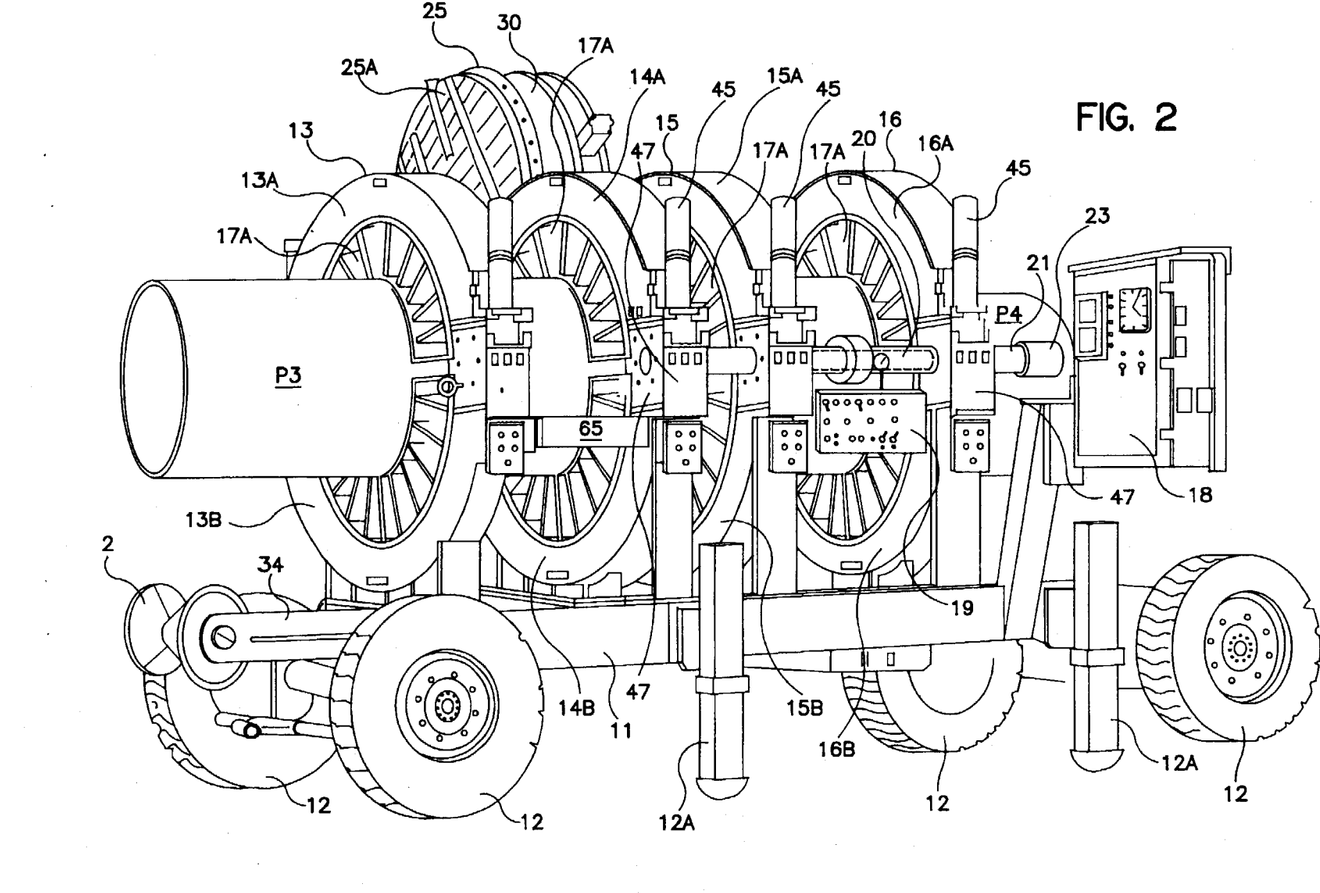
FIG. 2 is a perspective view of the butt fusion machine according to a preferred embodiment of the invention, modified with clamping jaw spacers to accommodate pipe of reduced diameter.

FIG. 2 illustrates the same butt fusion machine 10, with upper and lower spacers 17A and 17B installed in each of the jaws 13–16, inclusive. This permits smaller diameter pipe sections P3 and P4 to be butt fused as described in this application. Control panels 18 and 19 control and monitor all functions of the butt fusion machine 10.

Figure 3:
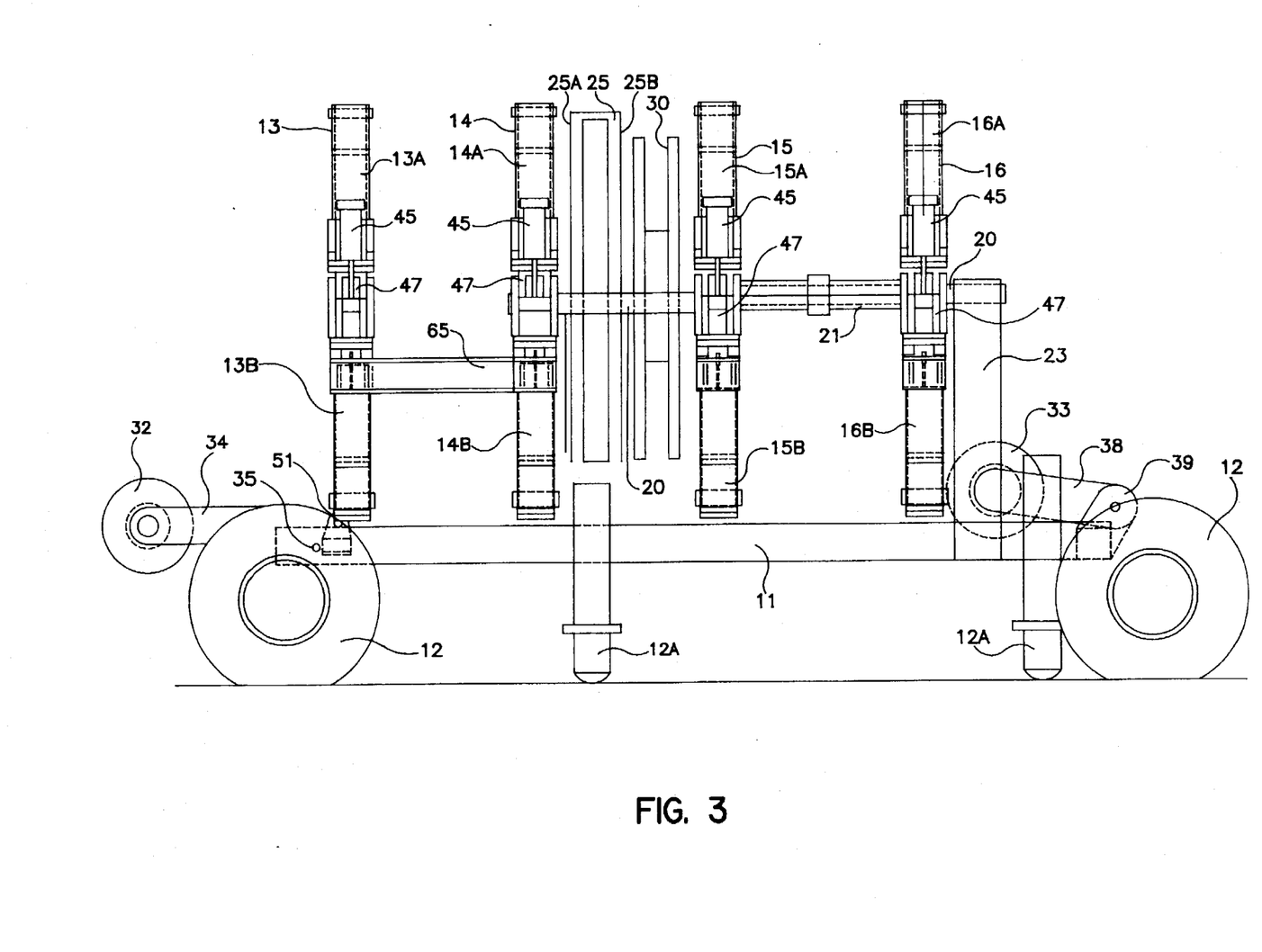
FIG. 3 is a simplified side elevation of the butt fusion machine according to FIG. 1.

As is best shown in FIG. 3, Pipe rollers 32 and 33 are carried by the frame 11 and assist in moving the two pipe sections "P1" and "P2" into and out of fusing position when the butt fusion machine 10 is being operated to butt fuse two straight pipes. Pipe roller 32 includes a pair of arms 34 mounted by pivot brackets 35 to frame 11 and is hydraulically-powered by a piston and cylinder assembly, not shown, to move upwardly and downwardly as needed to raise and lower the section of pipe "P1" being held in clamping jaws 13 and 14. Pipe roller 33 includes a pair of arms 38 mounted by pivot brackets 39 to frame 11 and is hydraulically-powered by a piston and cylinder assembly, not shown, to move upwardly and downwardly as needed to raise and lower the section of pipe being held in clamping jaws 15 and 16. Other types of pipe adjusting means can be used, as well.

DETAILED DESCRIPTION OF CLAMPING JAWS

Figure 4:
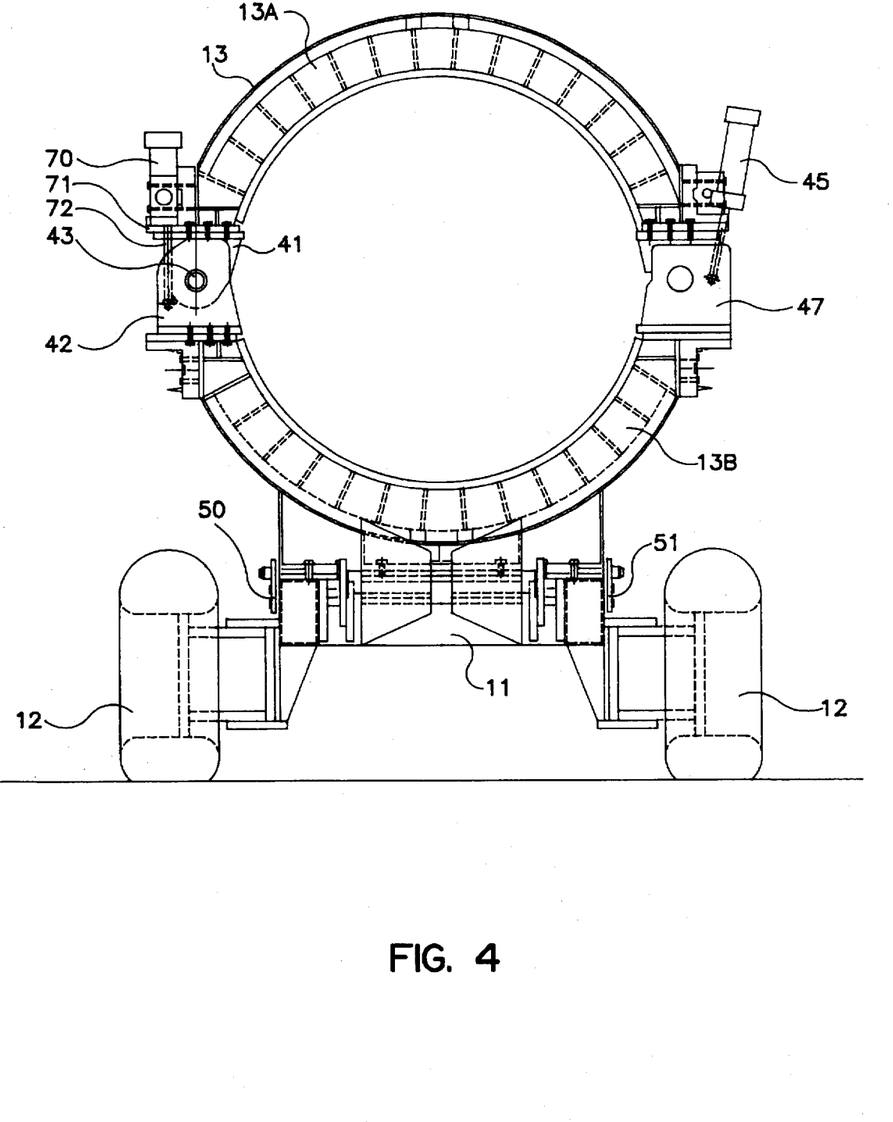
FIG. 4 is a front end elevation of the butt fusion machine of FIG. 1, with the pipe omitted for clarity.

Referring now to FIG. 4, upper and lower clamping jaw halves 13A, 13B are shown. Clamping jaws 14, 15 and 16 are constructed in the same manner, and the description of operation of the upper and lower jaw halves 13A, 13B which follows applies to jaw 14, 15, and 16, as well. As is shown, jaw 13 is mounted transverse to the longitudinal axis of the butt fusion machine 10. Upper jaw half 13A pivots about an axis defined on upper and lower hinges 41 and 42 about a pivot pin 43. Clamping takes place on the opposite side of the jaw 13, where a piston and cylinder assembly 45 attached to a clamping assembly 47 applies hydraulic clamping pressure to pipe section "P1" positioned in the jaw 13 through the rotational movement of the top clamp half 13A, as described in more detail below.

Jaw 13 is preferably pivoted on an axis perpendicular to the longitudinal axis of the pipe section "P1", so that it can be moved into a lowered position when a fitting, such as a "Tee" fitting is being joined to a pipe section "P2" being held by the jaws 15 and 16. As is shown in FIG. 4, laterally-spaced brackets 50 and 51 pivot to permit jaw 13 to rotate between the raised, vertical position shown in FIG. 4 and a lowered position with the jaw 13 in a horizontal position. When in its raised position, the jaw 13 is locked in an upright position by a beam 65 when extends horizontally between jaws 13 and 14.

The operation of this feature is explained in further detail in applicant's prior application Ser. No. 551,119.

Details of Clamping Jaws Geometry and Operation

Referring now to FIGS. 5–8, the details of the clamping jaws 13, 14, 15 and 16 are explained.

As noted above, the explanation of the jaw geometry and operation proceeds with reference to jaw 13, but applies as well to the other stationary jaw 14 and the movable jaws 15 and 16. Upper jaw half 13A is pivotally attached to lower jaw half 13B by a rotatable upper hinge 41 pivotally connected to a stationary lower hinge 42 carried on lower jaw half 13B. Pivotal connection is by a hinge pin 43 which extends through the hinges 41 and 42 and ties the upper and lower jaw halves 13A and 13B together, and about which the upper jaw half 13A pivots.

The pivotal center defined by the hinge pin 43 is on a common line formed by the geometric center of the circular jaw clamping surfaces of the upper and lower jaw halves 13A, 13B, and the center of rotation of the upper jaw half 13A in common with the horizontal centerline of the jaw 13.

Figure 5:
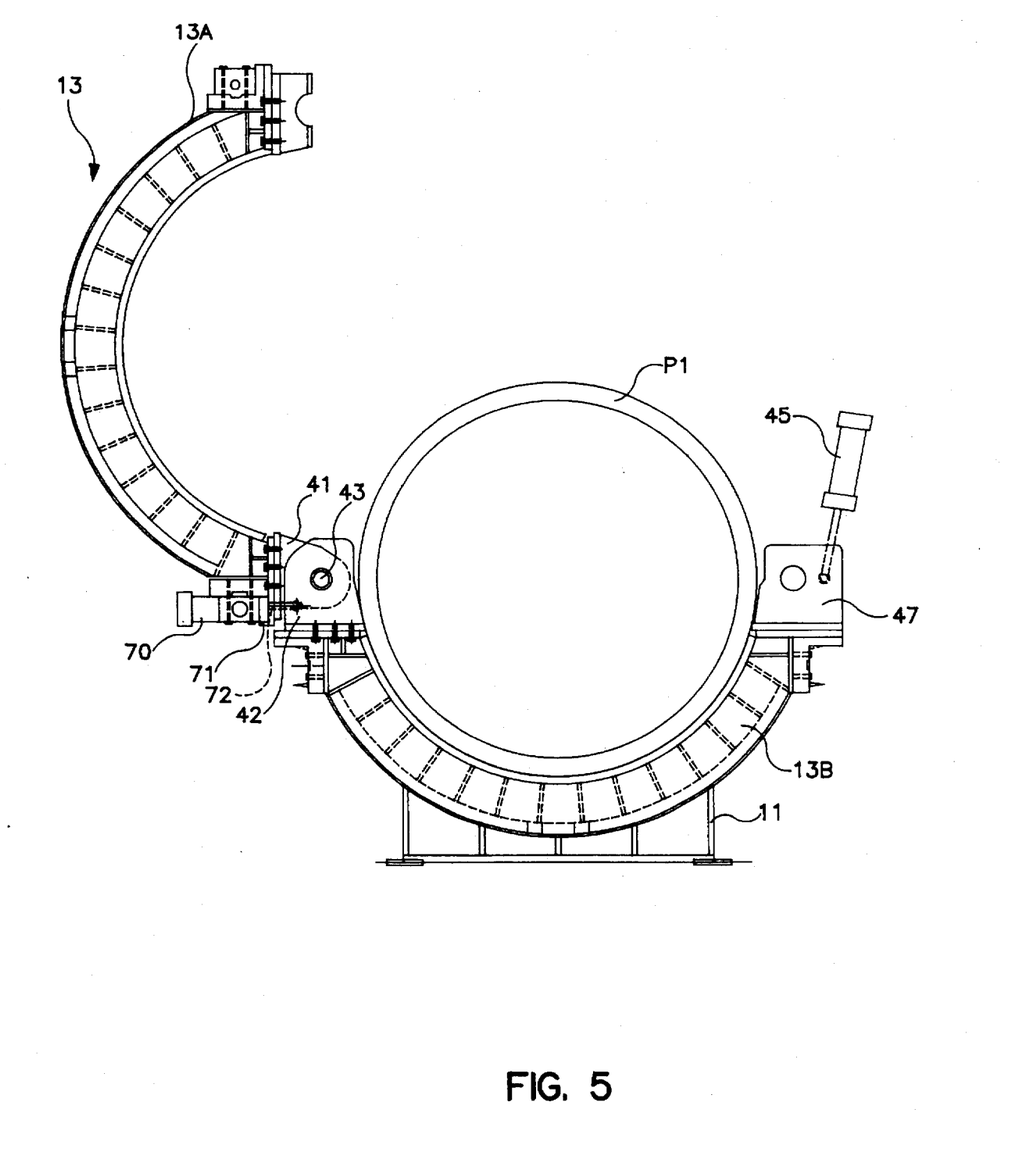
FIGS. 5, 6 and 7 are further simplified fragmentary front end elevations of the pivotable jaw assembly shown in FIGS. 1, 2, 3 and 4.
Figure 6:
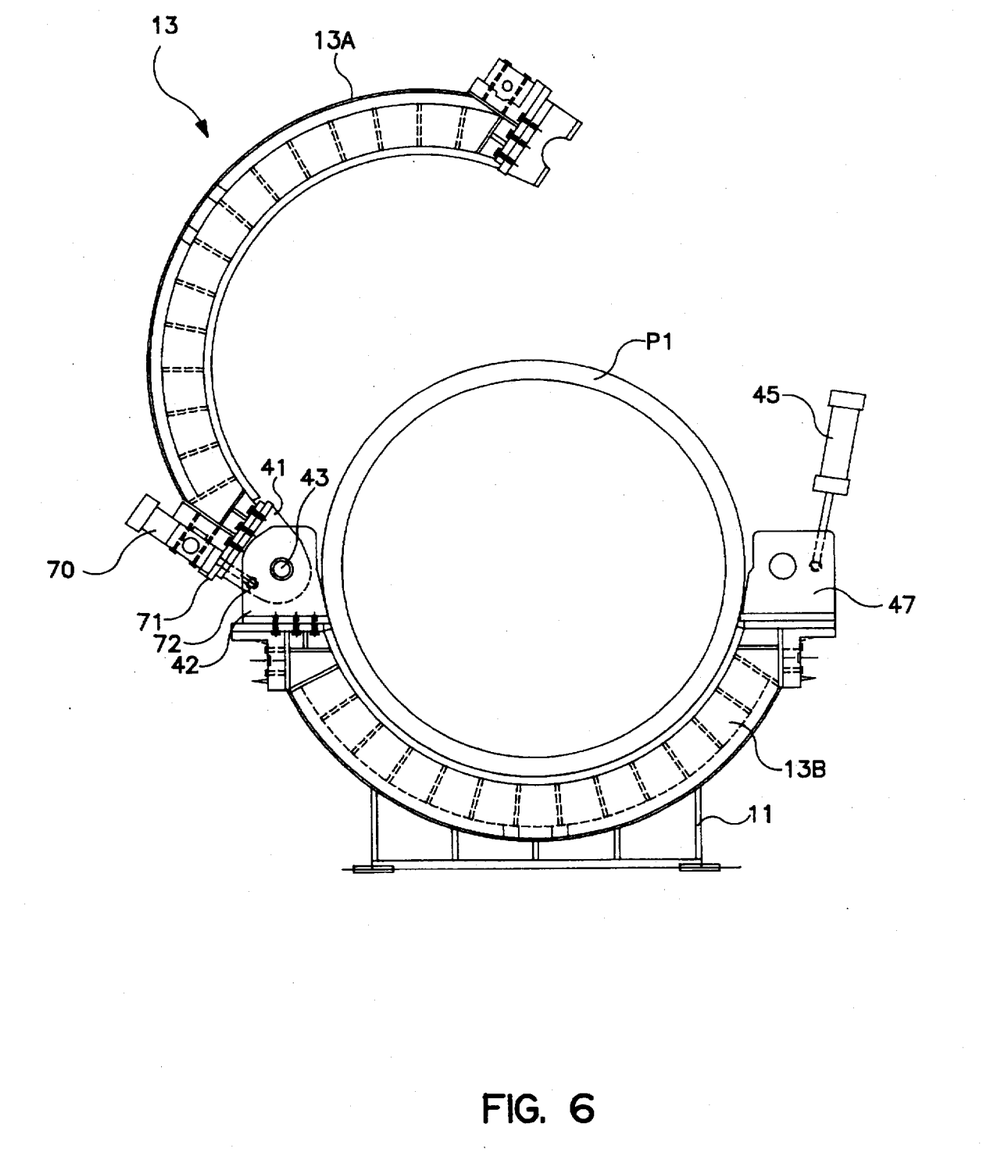
Figure 7:
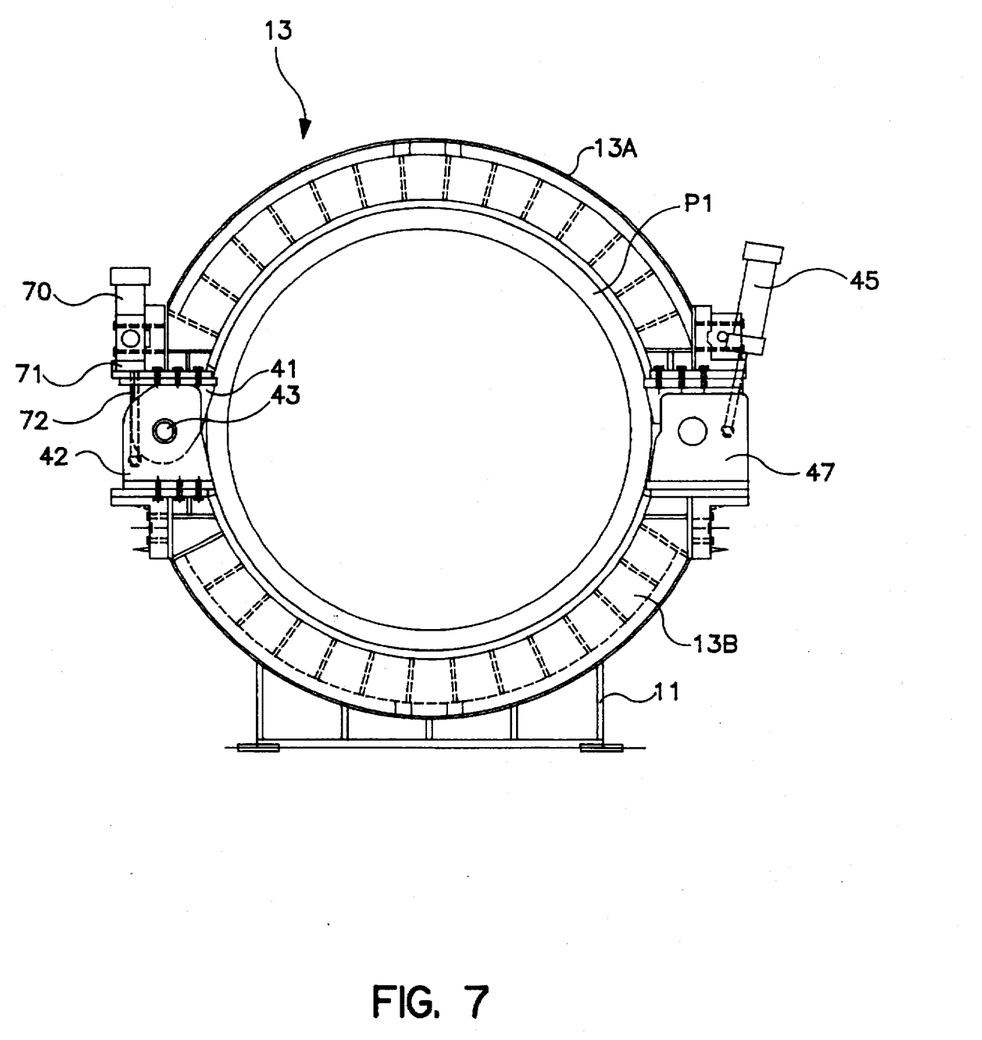

As is shown in FIGS. 4, 5 and 6, upper jaw 13A can therefore pivot through a range of motion wide enough so that large diameter pipe can be positioned in and cradled by the lower jaw 13B while the jaw 13A is open. The lower jaw 13B then cooperates with upper jaw 13A to clamp the pipe. Jaws 14, 15 and 16 pivot and clamp in the same manner as described above.

Each of the jaws 13, 14, 15 and 16 are opened and closed by respective hydraulic cylinders. As is best illustrated by way of example in FIGS. 5, 6 and 7, a hydraulic cylinder 70 is mounted on a mounting bracket 71 on the end of jaw 13A adjacent hinge 41. A piston rod 72 controlled by hydraulic cylinder 70 is pivotally pinned to hinge 42. As is seen by comparing the position of the hydraulic cylinder 70 and the piston rod 72 in FIGS. 5, 6 and 7, jaw 13A is closed by extending the piston rod 72, thereby moving jaw 13A in the clockwise direction. Conversely, jaw 13 is opened by retracting the piston rod 72, thereby moving the piston rod 72 in the counterclockwise direction. Each of the jaws 13, 14, 15 and 16 function in the same manner.

As noted above, when jaw 13 is closed, piston and cylinder assembly 45 attached to clamping assembly 47 applies hydraulic clamping pressure to pipe section "P1" positioned in the jaw 13. Compare FIGS. 4 and 7.

Operation of Butt Fusion Machine

Referring again to FIG. 1, butt fusion machine 10 is shown in the position in which sections of straight pipe "P1" and "P2" are butt fused together. Pipe section "P2" is inserted into the movable jaws 15 and 16 when the upper jaw halves 15A and 16A are pivoted away from the lower jaw halves 15B and 16b. The roller 33 may be used to move the pipe into the jaws 15 and 16, and to lift the pipe to the proper height. After the pipe section "P2" is properly positioned, the upper jaw halves 15A, 16B are closed and hydraulically locked into place through the action of the cylinder assemblies 45.

Pipe section "P1" is inserted into the stationary jaws 13 and 14 when the upper jaw halves 13A and 14A are pivoted away from the lower jaw halves 13B and 14b. The roller 32 may be used to move the pipe into or out of the jaws 13 and 14, and to lift the pipe to the proper height. After the pipe section "P1" is properly positioned, the upper jaw halves 13A, 14A are closed and mechanically locked into place around the pipe "P1" by the hydraulic cylinder assemblies 45 so that the pipe is immovably held.

Fine adjustments are made to place both pipe sections in exact axial alignment with each other and at an exact distance from each other. After alignment of the pipes are completed, the facing tool 30 is pivoted into the space between the pipes and rotated to properly face the pipes to provide a flat, properly aligned face on the pipe surfaces to be butt fused.

After facing with the facing tool 30 takes place, the pipe "P2" in the movable jaws 15 and 16 is repositioned and the heating assembly 25 is pivoted into the space between the pipes and the edges of the pipe are heated to the proper temperature. When proper temperature has been reached, the heating assembly 25 is pivoted out of the space between the pipes, and the pipe "P2" in the movable jaws 15 and 16 is shifted axially forward towards the stationary pipe "P1" in jaws 13 and 14. When the adjacent edges of the pipes meet, the melted plastic merges, and forms a completely integrated, unitary mass and a uniform circumferential fusion bead forms on both sides of the joint. This position is held until the plastic has cooled and hardened. The jaws 13-16 are opened by rotating the upper jaw halves 13A-16A out of engagement with the pipe, and the butt fusion machine 10 is driven forward along the pipeline run to a point forward of the joint in preparation for the next section of pipe.

Operation of Pressure Accumulator

Figure 8:
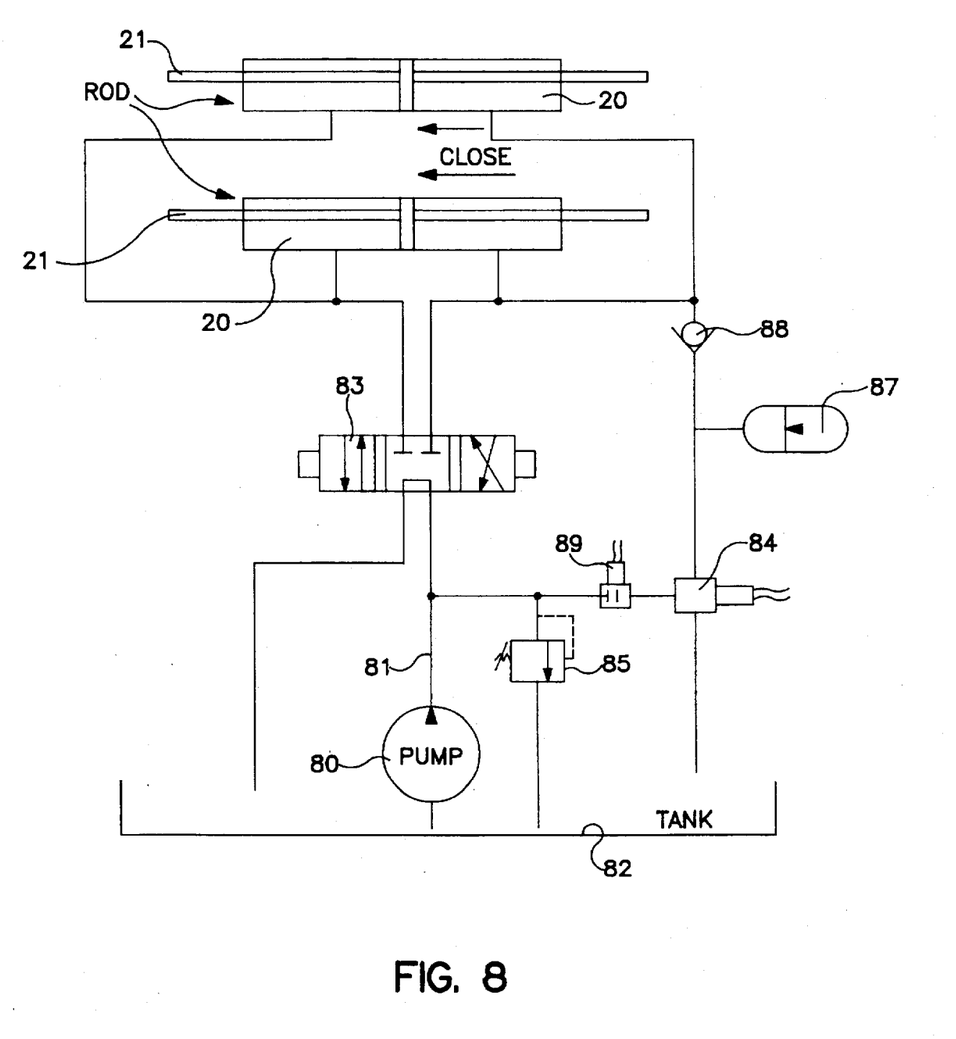
FIG. 8 is a simplified schematic diagram of the pressure accumulator according to an embodiment of the invention.

Referring now to FIG. 8, a pressure accumulator system according to an embodiment of the invention is shown schematically. As described above, the pipe sections P1 and P2 are held in place by pressure supplied by the guide rod cylinders 20 and the guide rods 21. If power to the machine is lost, or if the operator has finished work for the day and wishes to cut off the machine before the joint completely cooled, pressure is maintained in the hydraulic system so that the pipe joint is held stationary and under proper pressure until the joint has completely cooled.

As is shown in FIG. 8, the hydraulic system includes a pump 80 which circulates hydraulic fluid under pressure through hydraulic lines defining a hydraulic circuit 81. The fluid recirculates through the system and back to tank 82. Hydraulic fluid is controlled by a directional control valve 83 which directs fluid to the guide rod cylinders 20 which in turn moves the guide rods 21 and the jaws 15 and 16 mounted thereon into and out of position in relation to the stationary jaws 13 and 14 as described above. Proper pressure is maintained by an electronic pressure controller 84. Alternatively, a suitable manual controller can be used. Over-pressure conditions are prevented by a main relief valve 85 which short circuits the system back to tank 82 in the event pressure limits are exceeded.

A pressure accumulator in the form of a hydraulic pressure accumulator vessel 87 is positioned in the hydraulic circuit between the pressure controller 84 and the feed line from the guide rod cylinders 20. This pressure vessel 87 is pressurized to the same pressure as normally exerted on the guide rod cylinders 20 by pump 80 during the fusion process when solenoid valve 89 is operated. The pressure vessel 87 communicates only with the side of the guide rod cylinders 20 which exert pressure in the closing direction whereby the jaws 15 and 16 are moved in the direction of the jaws 13 and 14, as indicated by the directional arrows labeled "Close" in FIG. 8.

A check valve 88 permits pressure communication from the guide rod cylinders 20 to the pressure vessel 87. Upon failure of pump 80, or a situation when the machine must be or is desired to be shut off before a joint has completely cooled, solenoid valve 89 interrupts communication between the pressure vessel 87 and the non-operating pump 80, while the pressure controller 84 prevents back flow to tank 82. With the circuit thus interrupted, pressure in the pressure vessel 87, which is equal to pressure on the guide rod cylinders 20, continues to communicate with guide rod cylinders 20 through the check valve 88, thus preventing a pressure drop and thereby maintaining the guide rods 21 in their proper position. When desired, the guide rods 21 can be retracted from their closed position by operation of the directional valve 83.

A butt fusion apparatus with a hydraulic fluid pressure accumulator for maintaining pressure on the fusion joint while the joint material is cooling with the machine off. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. In an apparatus for attaching abutting ends of first and second coaxial thermoplastic pipe sections together, and including a support frame, a fixed pipe clamping jaw having upper and lower jaw halves carried by the support frame for positioning the first pipe section in a fixed position, a movable pipe clamping jaw having upper and lower jaw halves carried by the support frame for translating movement of the second pipe section relative to the fixed clamping jaw and into aligned abutment with the first pipe section, heating means for heating adjacent pipe ends to a butt fusion temperature and a hydraulic circuit including a hydraulic pressure pump for supplying pressure to hydraulic movement means to translate the movable pipe clamping jaw towards the fixed pipe clamping jaw in a closing direction to join the first and second heated pipe sections together under pressure;

the improvement comprising supplemental hydraulic pressure means for supplying hydraulic pressure to said hydraulic movement means, said supplemental hydraulic pressure means comprising:

(a) a directional control valve for directing fluid from said pressure pump to said hydraulic movement means for moving said hydraulic movement means in an opening and closing direction;

(b) a pressure accumulator for accumulating hydraulic fluid under pressure;

(c) a check valve positioned between said pressure accumulator and said hydraulic movement means for permitting pressure communication from said pressure accumulator to said hydraulic movement means;

(d) a solenoid valve positioned between said pressure accumulator and said pressure pump for interrupting communication between said pressure accumulator and said pressure pump during non-operation of said pressure pump, such that upon non-operation of said pressure pump said accumulator maintains pressure on said hydraulic movement means only in the closing direction through said check valve, the pressure supplied by said accumulator being substantially equal to the pressure exerted on said hydraulic movement means during normal operation of said pressure pump; and (e) a pressure controller for maintaining proper pressure in the hydraulic circuit.

2. In an apparatus according to claim 1, wherein said supplemental hydraulic pressure means includes pressure regulator control means for setting a pressure in said accumulator vessel appropriate to the pipe joints being fused.

3. In an apparatus according to claim 1, wherein said hydraulic movement means comprises a pair of guide rods on which said moveable jaws are mounted for movement, and a pair of hydraulic guide rod cylinders in which respective ones of said guide rods are mounted for hydraulic pressure-induced movement.

* * * * *